(12) United States Patent
Söderstedt

(10) Patent No.: US 8,701,104 B2
(45) Date of Patent: Apr. 15, 2014

(54) SYSTEM AND METHOD FOR USER AGENT CODE PATCH MANAGEMENT

(75) Inventor: Torbjörn Söderstedt, Linköping (SE)

(73) Assignee: Opera Software ASA, Oslo (NO)

( * ) Notice: Subject to any disclaimer, the term of this patent is extended or adjusted under 35 U.S.C. 154(b) by 986 days.

(21) Appl. No.: 12/637,172

(22) Filed: Dec. 14, 2009

(65) Prior Publication Data
US 2011/0145803 A1 Jun. 16, 2011

(51) Int. Cl.
*G06F 9/44* (2006.01)

(52) U.S. Cl.
USPC ........... 717/173; 717/140; 717/154; 717/168; 717/171; 717/172; 709/203

(58) Field of Classification Search
None
See application file for complete search history.

(56) References Cited

U.S. PATENT DOCUMENTS

| | | | | |
|---|---|---|---|---|
| 6,433,794 B1 * | 8/2002 | Beadle et al. | | 715/700 |
| 6,948,164 B2 * | 9/2005 | Tinker | | 717/168 |
| 6,950,847 B2 * | 9/2005 | Harrisville-Wolff et al. | | 709/201 |
| 7,657,885 B2 * | 2/2010 | Anderson | | 717/170 |
| 7,721,303 B2 * | 5/2010 | Alves de Moura et al. | | 719/328 |
| 7,797,752 B1 * | 9/2010 | Vaidya et al. | | 726/27 |
| 7,934,212 B2 * | 4/2011 | Lakhdhir | | 717/170 |
| 8,091,077 B1 * | 1/2012 | Pliss et al. | | 717/140 |
| 2002/0188665 A1 * | 12/2002 | Lash | | 709/203 |
| 2004/0002943 A1 * | 1/2004 | Merrill et al. | | 707/1 |
| 2005/0144616 A1 * | 6/2005 | Hammond et al. | | 717/173 |
| 2006/0184651 A1 * | 8/2006 | Tirnumala | | 709/220 |
| 2007/0078947 A1 * | 4/2007 | Lakhdhir | | 709/217 |
| 2008/0301667 A1 * | 12/2008 | Rao et al. | | 717/172 |
| 2009/0298582 A1 * | 12/2009 | Dempsky et al. | | 463/29 |
| 2010/0223602 A1 * | 9/2010 | Kreek et al. | | 717/140 |
| 2010/0287544 A1 * | 11/2010 | Bradfield et al. | | 717/172 |

FOREIGN PATENT DOCUMENTS

GB 2 227 584 A 8/1990 ............. G06F 12/12

OTHER PUBLICATIONS

'Java Virtual Machine' article from Wikipedia.org, posted on Nov. 20, 2009.*
'Dynamic upgrade of software' by Mika Karlstedt (date unknown, but 'Seminar Self-Healing Systems' cites it in 2007).*
'Seminar Self-Healing Systems,' Department of Computer Science, from www.cs.helsinki.fi, published on Jun. 9, 2007 (cites Karlstedt above).*

* cited by examiner

*Primary Examiner* — Steven Snyder
(74) *Attorney, Agent, or Firm* — Birch, Stewart, Kolasch & Birch, LLP

(57) ABSTRACT

A system and method for executing a user agent in an electronic device. Upon each startup of the user agent, the electronic device loads binary code of a base version of the user agent into memory, and determines whether a binary patch has previously been downloaded. If the patch has been downloaded, it is applied to the base version and the updated base version is executed. The binary patch may be downloaded from a server, which compiles the binary patch on the basis of stored source code of the base version and stored source code of one or more enhancements selected by the electronic device.

9 Claims, 8 Drawing Sheets

SYSTEM AND METHOD FOR USER AGENT CODE PATCH MANAGEMENT

FIELD OF THE INVENTION

The invention relates generally to extending the functionality of a user agent such as a web browser which is implemented in a handheld or mobile device.

BACKGROUND OF THE INVENTION

Computer users typically use user agent applications such as web browsers to access documents and other resources that are available over a computer network, and perform other functions such as communicate with friends, play games, and upload resources to the network to be accessed by others.

Typically, an application programming interface (API) is built into a user agent for the purpose of extending the user agent's functionality. Such an API defines ways in which other software applications may request services from the user agent. This allows "add-on" or "plugin" software to be written to extend the functionality of the user agent, based on vocabulary and calling conventions defined within the relevant API. Furthermore, the API information can be published to allow third parties to develop add-ons or plugins for the user agent.

However, user agents such as web browsers are increasingly being used on mobile or handheld devices with limited processing, memory, and storage capabilities. Examples of such devices include cellular telephones, personal digital assistants (PDA's), "netbooks," etc. The installation of add-on or plugin software consumes memory and storage of such devices, as does the inclusion of the API in the user agent. Also, downloading add-on or plugin software to mobile/handheld devices can be slow, due to the amount of data being downloaded and the limited bandwidth and processing capabilities of such devices.

Furthermore, it is not possible for an add-on or plugin to change the actual native code of the device. Thus, the binary code of the base version of the user agent cannot be changed or updated using software extensions such as add-ons or plugins.

SUMMARY OF THE INVENTION

A system and method is described herein which allows the functionality of a user agent to be extended in an improved manner.

An exemplary embodiment is directed to a system and method for executing a user agent in an electronic device. Such method may include storing binary code of a base version of the user agent in a first data storage area of the device; utilizing a processor in the device to initiate execution of the user agent by: loading the binary code of the base version in the first data storage into memory, determining whether a binary patch exists in a second data storage area of the device, executing the binary code of the base version if the binary patch is determined not to exist, and applying the binary patch to update the binary code of the base version and executing the updated binary code if the binary patch is determined to exist.

According to this exemplary embodiment, a binary patch can be downloaded to the electronic device via a network while the user agent is running. Furthermore, this binary patch can be downloaded from a server in response to the electronic device receiving user input designating one or more selectable enhancements to the user agent, and transmitting a message to the server identifying the designated enhancement(s).

Thus, according to the abovementioned exemplary embodiment, enhancements to the user agent can be downloaded as a binary patch. This helps reduce the size of downloadable enhancements, thereby providing faster downloading of user agent enhancements and saving storage space in the electronic device.

Another exemplary embodiment is directed a system and method implemented in a server for providing to the electronic device a binary patch including the designated enhancement(s). Such server may include a data storage device which stores the source code of a base version of a user agent installed in the device, and source code of a plurality of enhancements to the user agent. The method according to this embodiment may include: receiving a message from an electronic device designating one or more of the enhancements via the network; compiling a combination of the source code of the one or more designated enhancements into a binary patch, based on the source code of the base version; and transmitting the binary patch to the device via the network.

In this exemplary embodiment, as a process for compiling the combination of source code of the designated enhancement(s) into the binary patch, the server may perform the following: compile the source code of the base version alone to produce a first binary executable; compile the source code of the base version together with a combination of the source code of the one or more designated enhancements to produce a second binary executable; compare the second binary against the first binary executable to determine changes therein; and produce the binary patch to contain the determined changes. For example, if it is determined that code optimization in compiling the first binary executable (i.e., of the base version alone) removed code which is needed by the code of the designated enhancement(s), such removed code may be re-inserted by the binary patch. On the other hand, it may be determined that code optimization for compiling the second binary executable caused some code to be removed from the base version, which was not removed by optimization when compiling the first binary executable. I.e., it can be determined whether some of the code in the base version can be replaced (or rendered unnecessary) by code in the designated enhancement(s).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention is directed toward a system and method of implementing a user agent (e.g., web browser) into an electronic device (e.g., mobile phone or PDA) in which the functionality of the user agent can be extended quickly and easily, and without requiring too much processing and storage resources from the device. This can be accomplished by storing a binary executable of the base version of the user agent, and downloading software extensions (also referred to as "enhancements" to the user agent) as a binary patch. The binary executable (also referred to as "binary") of the base version can be stored in a protected storage area of the device. The binary patch can be stored persistently in a dedicated storage area of the device, until such time the user decides to further enhance the user agent or, possibly, revert back to the base version. The user agent may then be restarted to apply the enhancement(s).

Thereafter, each time the user agent is started, the binary of the base version may be loaded into memory so that the binary patch can be applied by a binary patch utility installed in the device. This patching may result in, e.g., removing part of the base version of the user agent no longer needed, restore part of the base version removed by an earlier optimization (when the source code of the base version was compiled), and/or insert new code from the enhancement(s).

As such, it is not necessary to install an API in the electronic device, or otherwise customize the code on the device, to extend the functionality of the user agent. Instead, the binary patch utility handles this. Also, since enhancements are downloaded in the form of binary patches, downloads are fast and involve only a small amount of data.

Figure 1:
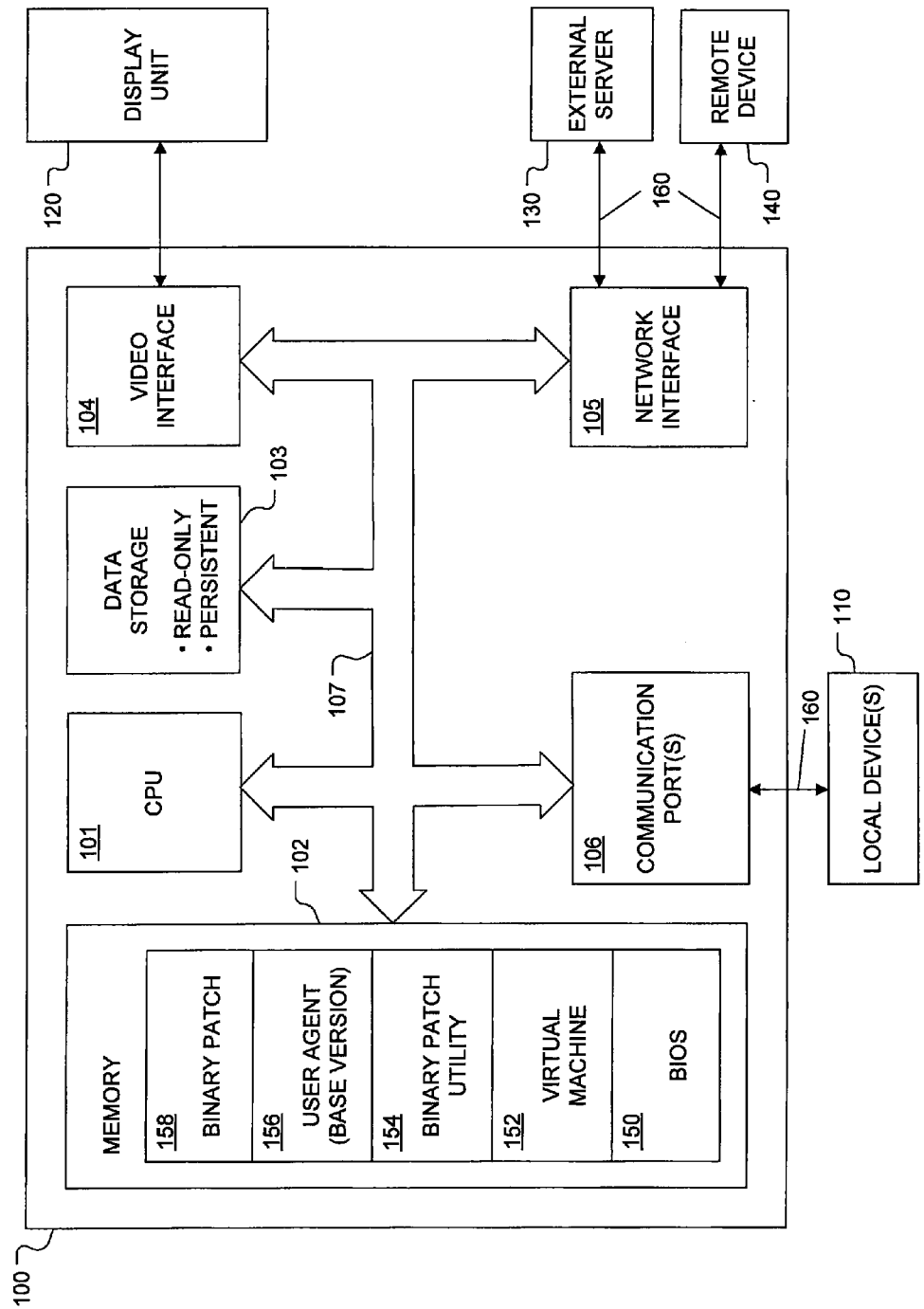
FIG. 1 is a diagram illustrating an electronic device that can be used in connection with an exemplary embodiment of the present invention.

FIG. 1 illustrates a generalized electronic device 100 that can be used as an environment for implementing various aspects of the present invention. According to exemplary embodiments, it is contemplated that the electronic device 100 may be implemented as a mobile or handheld device, e.g., a personal digital assistant (PDA), mobile telephone, etc. However, the principles of the present invention may be applied to other types of computer devices 100, such as desktop computer, laptop computers, and any other type of computer device 100 as will be contemplated by those of ordinary skill in the art.

In FIG. 1, a device 100 has various functional components including a central processor unit (CPU) 101, memory 102, data storage 103, a video interface 104, a network interface 105, and communication port(s) 106. These components may be in communication with each other by way of a system bus 107.

The memory 102, which may include ROM, RAM, flash memory, or any other combination of fixed and removable memory, stores various software components when they are running on the system, and data relating to the running processes. According to an exemplary embodiment, the software components and data which are in memory 102 at a given time may include a basic input/output system (BIOS) 150, a virtual machine 152, a binary patch utility 154, a binary of the base version of the user agent 156, and a binary patch 158. Examples of other software components which may be found in memory 102, but which are not shown in FIG. 1, include an operating system, various applications and device drivers, and other executable files or instructions such as macros and scripts. Also, the memory 102 may include various types of data (not shown) which are used by software components as they are executed.

As discussed above, one of the running software components in memory 102 may include a virtual machine 152 which is compiled into the device 100. A "virtual machine" refers to a software implementation of a machine or computer which executes other programs like an actual machine or computer. As such, the virtual machine 152 may comprise a series of computer instructions which, when executed by the CPU 101, interprets and executes the code of other programs, e.g., base version of the user agent 156. The programs executed by the virtual machine 152 are limited to the resources and abstractions provided within the virtual machine 152; such programs cannot break out of this virtual world and access other resources. The virtual machine 152 program may kept in data storage 103 (described below), transferred to memory 102 when the device 100 is turned on, and executed by the CPU 101 to cause the device 100 to perform operations consistent with principles of the present invention described herein.

According to an exemplary embodiment, the virtual machine 152 may be designed to run applications which are compiled into a byte-code binary. For instance, the base version of the user agent 156 may be compiled into the form of a byte-code binary to be executed by the virtual machine 152.

Thus, in an exemplary embodiment, the base version of the user agent 156 may be written in a programming language which can be compiled into a byte-code binary. Such a programming language could include one or both of the following attributes: names from the source code are not included in the byte-code binary, and code optimization is performed when compiling source code. Also, it is contemplated that software extensions, e.g., enhancements to the base version of user agent 156, can be written in the same type of programming language as the base version 156, although any enhancement would ultimately be sent to the device 100 as a binary patch 158 to be applied to the base version 156 by the binary patch utility 154.

It is also possible for the binary patch utility 154 to be compiled as a byte-code binary to be executed by the virtual machine 152. Alternatively, the binary patch utility 154 may be integrated as part of the virtual machine 152, or otherwise implemented on the device 100 in any manner which allows it to be executed when needed.

While the virtual machine 152 has been described as being configured to run byte-code binaries in an exemplary embodiment, this is not intended to be limiting on the present invention. For instance, the virtual machine 152 may be designed to run other types of binary executables, as will be contemplated by persons of ordinary skill in the art. The virtual machine 152 could also be configured to provide an environment for writing add-ons or extension software to be compiled separately, rather than being deployed as a binary patch against the base version 156.

Referring again to FIG. 1, the data storage component 103 may include a flash memory, hard disk drive, removable storage device (e.g., memory card), other types of volatile or non-volatile storage devices, or any combination thereof. According to an exemplary embodiment, a binary of the base version of the user agent 156 may be stored in a protected area of data storage 103, e.g., a read-only storage area, and loaded into memory 102 upon startup of the user agent. For example, the binary of the base version 156 may be installed into a particular read-only, non-volatile area of data storage 103 at some point in the manufacturing process of the device 100. However, it is not required for the protected storage area to be read-only. For instance, it is contemplated that the binary of the base version 156 could be downloaded by the user after the device 100 has shipped, and kept in a designated area of data storage 103. It might be beneficial, however, to provide some measure in the device 100 to protect the binary of the base version 156 from being deleted or modified while in data storage 103.

The data storage component 103 may also include another type of storage area for the binary patch 158, which is downloaded as an enhancement to the user agent (i.e., base version 156) consistent with principles of the invention described herein. The binary patch 158 should be persistently stored in data storage 103, i.e., it should survive shutdowns of the program effecting the download (e.g., user agent) and of shutdowns of the device 100 itself. According to an exemplary embodiment, when a binary patch 158 is downloaded, it may be stored in a particular location in data storage 103 set aside for downloaded enhancements, and remain there until it is replaced with another binary patch 158 providing another enhancement, or (as an optional feature) the user chooses to revert the functionality of the user agent back to its base version.

Referring again to FIG. 1, the communication ports 103 may be connected to one or more local devices 110 such as user input devices, a printer, a media player, external memory devices, and special purpose devices such as, e.g., a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120. It is possible that the display unit 120 might have a touch-sensitive screen allowing the display unit 120 to double as a touch-sensitive input device. The touch-sensitive input device aspects of the display unit 120 may be considered as one of the local devices 110 communicating over a communication port 103. Further, for exemplary embodiments in which the electronic device 100 is implemented as a PDA, mobile telephone, or other small portable device, the display unit 120 will generally be an integrated display such as an LCD display. However, it will be readily apparent that the principles of the present invention may be applied to situations where the display unit 120 is not integrated with the other elements of the computing device 100, e.g., where the display unit 120 is a standalone monitor.

The network interface device 105 provides the device 100 with the ability to connect to a network in order to communicate with an external server 130 and/or a remote device 140. The communication network 160, which in FIG. 1 is only illustrated as lines connecting the network interface 105 with the server 130 and remote device 140, may be, e.g., a local area network, a mobile telephone network (e.g., GSM, UMTS, or CDMA), a wireless network such as Wi-Fi Wireless LAN (IEEE 802.11) or WiMAX (IEEE 802.16), or the Internet. The server 130 may be configured to distribute enhancements to the user agent in the form of binary patches 158, in accordance with principles of the invention, as will be described in more detail below. The remote device 140 may in principle be any computing device with similar processing and communications capabilities as the device 100, but may also be another server or some other unit providing a networked service.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present. Furthermore, while the device 100 may be a mobile device of limited resources such as a PDA, cell phone, or netbook, as suggested earlier, it could also be any type of general purpose computer such as a desktop PC.

Figure 2:
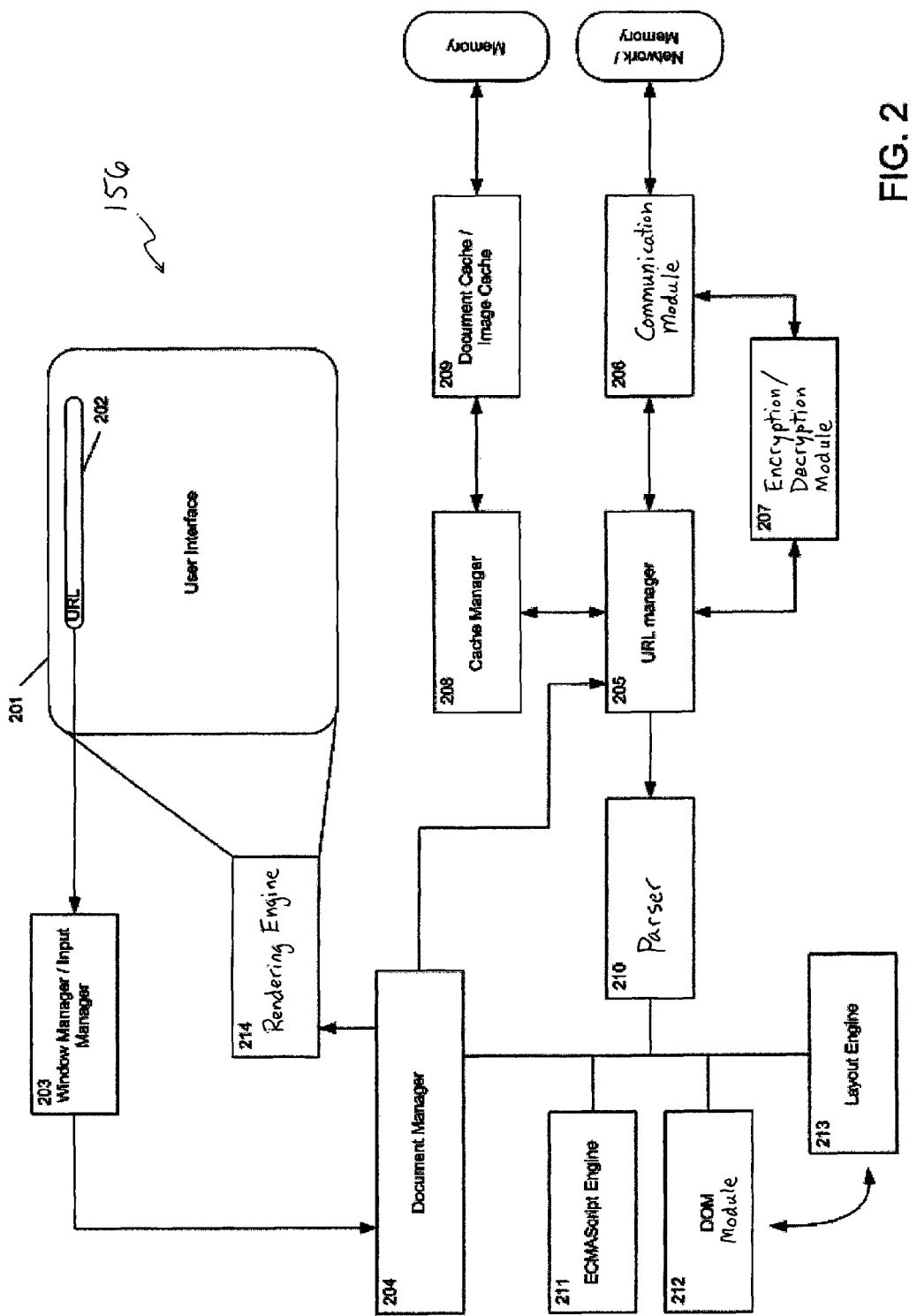
FIG. 2 is a diagram illustrating an example of a user agent that may be installed within an electronic device in accordance with an exemplary embodiment of the present invention.

FIG. 2 is a diagram illustrating an example of the base version of the user agent 156 that may be installed within the electronic device 100 in accordance with an exemplary embodiment of the present invention. Particularly, FIG. 2 shows an example of a number of functional components that may be programmed into the base version of the user agent 156.

The functional components illustrated in FIG. 2 may be implemented by a programmer as software modules which are compiled into the binary executable of the base version of the user agent 156. However, it is also possible that the functionality associated with any of these components could alternatively be implemented by hardware in the device 100, or implemented partly by the base version 156 software and partly by hardware, as will be contemplated by those skilled in the art. It will further be understood that, some of the functionality described below in connection with FIG. 2 may alternatively be implemented as part of an operating system (not shown) or the BIOS 150 of the device 100, or even as an enhancement to the user agent which is implemented by downloading a binary patch 158 consistent with principles of the present invention described herein.

The base version of the user agent 156 includes a user interface 201 that may be displayed on the display unit 120 shown in FIG. 1. The user interface 201 may include an address field 202 where the user may input or select the universal resource locator (URL) of a document or a service he or she wants to retrieve. For example, the user may use a keyboard or other type of input device to type in the URL in the address field 202. The address field 202 may also be a link that is displayed and may be activated by the user by touch according to principles of the present invention (alternatively, such a link may also be activated using a pointing device such as a mouse). Alternatively the URL may be specified in the code of a document or script already loaded by the user agent.

In any case, the URL may be received by a window and input manager 203 that represents the input part of the user interface 201 associated with, or part of, the base version of the user agent 156. The URL may then be forwarded to a document manager 204, which manages the data received as part of the document identified by the URL.

The document manager 204 forwards the URL to a URL manager 205, which instructs a communication module 206 to request access to the identified resource. The communication module 206 may be capable of accessing and retrieving data from a server 130 or remote device 140 over the network 160 using the hypertext transfer protocol (HTTP), or some other protocol such as HTTPS or FTP. The communications module 206 communicates with the server 130 or remote device 140 using the network interface 105. The communication module 206 may also be capable of accessing data that is stored in local memory 102 or data storage 103.

If communications outside the device 100 is required to be encrypted, e.g., as specified by the protocol used to access the URL, encryption/decryption module 207 handles communication between the URL manager 205 and the communication module 206.

The data received by the communication module 206 in response to a request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a server 130 or remote device 140 when the same URL is requested a second time.

The URL manager 205 forwards the data received from the communication port 206 or cache 209 to a parser 210 capable of parsing content such as HTML, XML and CSS. The parsed content may then, depending on the type and nature of the content, be processed further by an ECMAScript engine 211, a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL.

When the data representing the content of the specified document has been processed it is forwarded from the document manager 204 in order to be rendered by a rendering engine 214 and displayed on the user interface 201.

The various functional components thus described may be programmed as a corresponding set of software modules in source code, which are compiled into the binary (e.g., byte-code binary) which is executed by the virtual machine 152. Of course, the functionality of various components in FIG. 2 may be programmed into fewer larger modules, and the functionality of a single component in FIG. 2 may be distributed or replicated over several software modules in the source code.

Further, as mentioned above, it is not necessary for the base version of the user agent 156 to be programmed to include all of the functionality and/or components illustrated in FIG. 2. It is even contemplated that some of the functionality in FIG. 2 may be implemented by enhancements which are downloaded to the device 100 as a binary patch 158.

As mentioned above, the functionality of the base version of the user agent 156 may be extended or enhanced by software which is downloaded to the electronic device 100 in the form of a binary patch 158. According to an exemplary embodiment, such software enhancements may be stored in source code form in one or more servers 130. When an electronic device 100 requests an enhancement or combination of enhancements from a particular server 130, the server 130 may compile the source code of the requested enhancement(s) into an optimized binary patch 158 for downloading to the device 100.

Figure 3:
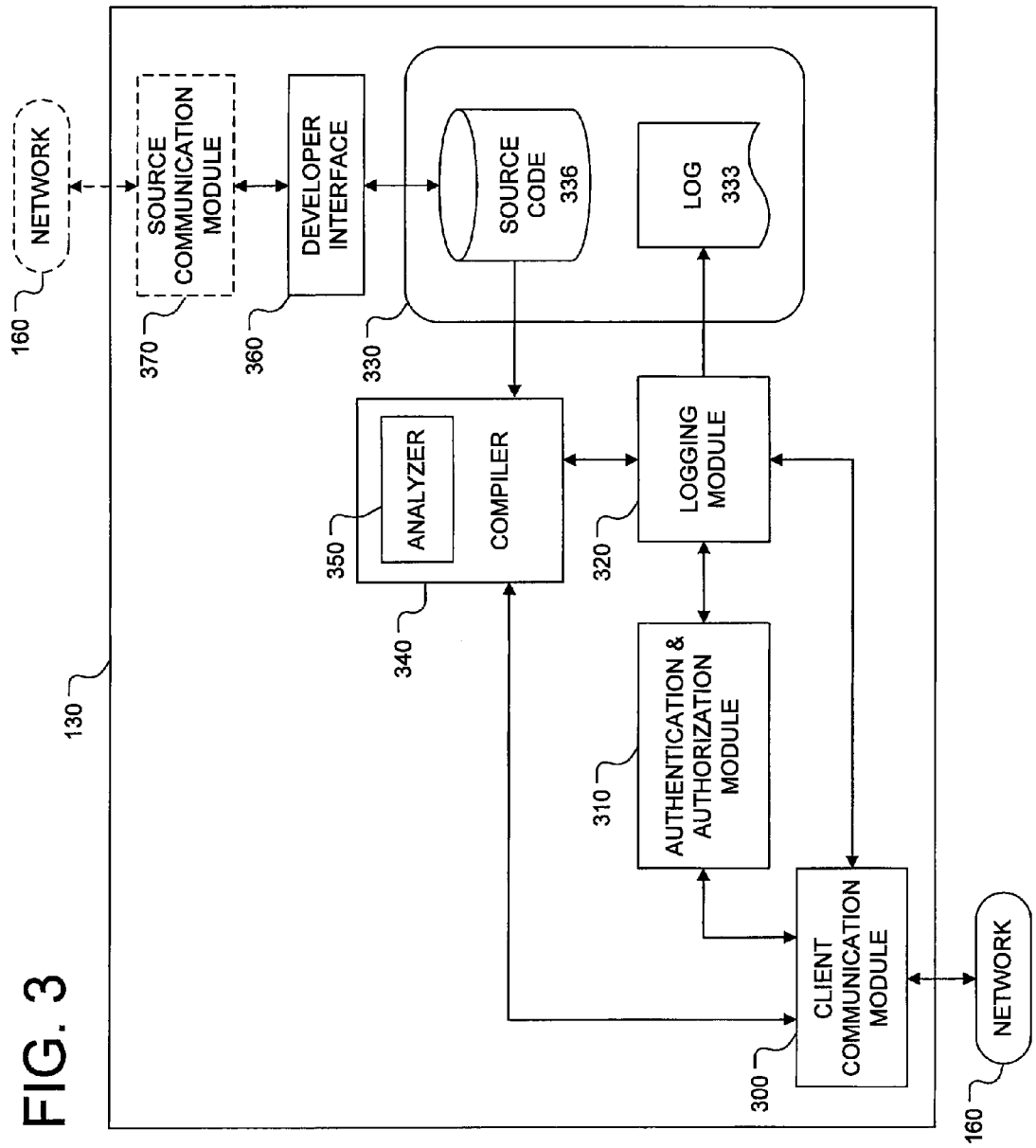
FIG. 3 is a diagram illustrating a server that can be used in connection with an exemplary embodiment of the present invention.

FIG. 3 is a diagram illustrating components of a server 130 that can be used in connection with an exemplary embodiment of the present invention.

Among the modules in FIG. 3 is a client communication module 300 that may be configured to receive requests from devices 100 via the network 160. The client communication module 300 may receive HTTP(S) requests over TCP/IP, but consistent with the principles of the invention, the communication device 300 may also communicate using other standards or protocols and other types of networks than the Internet. By way of example, the client communication module 300 may be configured to communicate, directly or indirectly, over a mobile telephone network such as GSM, UMTS, CDMA or over wireless networks such as Wi-Fi Wireless LAN (IEEE 802.11) or WiMAX (IEEE 802.16).

The client communication module 300 may be connected to an authentication and authorization module 310, which determines whether a requesting client needs to be authenticated and determines whether the client is authorized to access requested resources from the server 130. Authentication and authorization can be handled by methods that are well known by those skilled in the art. One example of such methods is username/password combinations.

For instance, the client may be an electronic device 100 requesting one or more enhancements to the base version of the user agent 156, or requesting a list of enhancements available on the server 130. However, according to an exemplary embodiment, the server 130 may also be configured to serve requests for other resources on the network 160, which are identifiable by URL's or universal resource identifiers (URI's).

The server 130 may maintain a log 333 of requests and the results of authentication via a logging module 320. The log 333 may be stored in a data storage device 330 comprised of a hard disk drive, an optical disk drive, a disk array formed of multiple disk drives, solid-state storage (e.g., flash drive), magnetic tape, any other type of data storage as will be contemplated by those of ordinary skill in the art, or any combination thereof.

Furthermore, the data storage device 330 may also store the source code of the base version of the user agent 156, and the source code for each enhancement thereof which is available through the server 130. This is collectively illustrated as source code 336 in FIG. 3. A compiler 340 is further provided in server 130 for compiling such source code 336, which corresponds to a combination of one or more enhancements selected by a user of an electronic device 100, into a binary patch 158.

According to an exemplary embodiment, the process of compiling the selected enhancement(s) into the binary patch 158 may include compiling the source code of base version of the user agent 156 into one binary executable, and also compiling the source code of the base version 156 together with the source code of the selected enhancement(s) into another binary executable. For instance, this could be done as part of a process of compiling the binary patch 158 to contain changes implemented by the selected enhancement(s) against the base version 156 (such process being described in more detail below). The aforementioned binary executables may be produced by the compiler 340 in byte-code binary form. As such, the source code 336 for the base version 156 and enhancements may be written in a programming language which is designed specifically to be compiled into byte-code binary form.

Also, the compiler 340 may be designed to implement code optimization as part of the compilation process. Code optimization generally refers to a process for tuning the output of the compiler 340 to minimize or maximize some attribute of the resultant binary, e.g., minimize time for execution and/or minimize the amount of memory occupied. For example, the code optimization implemented by the compiler 340 may be designed to perform one or more of the following processes: removing unused classes, methods, or fields from the source code; in-lining methods in the source code; turning virtual methods into final methods and removing them from the virtual method table in a class; and other optimization processes known in the art.

As mentioned earlier, the compiler 340 may compile the source code of the base version of the user agent 156 alone into a first binary executable, and also compile the source code of the base version 156 together with the source code of one or more selected enhancements into a second binary executable. As such, the compiler 340 may include an analyzer component 350 which analyzes the two binaries in order to detect changes in the second binary executable against the first binary executable, i.e., to detect changes implemented by the selected enhancement(s) against the base version 156. Please note, the terms "first binary executable" and "second binary executable" are used merely to distinguish the two binaries, and should not be interpreted as indicating a particular sequence in which the two binaries are to be compiled. For example, it does not make a difference whether the compiler 340 produces the second binary executable before the first, or vice versa.

The analyzer 350 may be implemented in the compiler 340 to be functionally equivalent to a diff utility. Persons ordinarily skilled in the art will understand that a diff utility can be used to output the differences between two binary files as a patch (or a "diff" as sometimes referred to in the art). Thus, the analyzer 350 may be used to generate the binary patch 158 on the basis of the first and second binary executable. However, a diff utility is only one example of the type of analyzer component 350 which may be implemented in the compiler 340. For instance, the analysis of the analyzer component 350 may be enhanced with respect to conventional diff utilities, by taking into consideration certain aspects of format binary code in order to reduce the size of the binary patch 158. For instance, if all unused methods or routines in the first binary executable were to be removed, this could require many more addresses in the code to be updated, and considerably increase the size of the binary patch 158. Thus, the analyzer 350 could decide to allow certain unused methods or routines to remain, in order to reduce the size of the binary patch 158.

Among the types of changes to be detected by the analyzer 350 is the insertion of new code from the selected enhancement(s) into the second binary executable. However, the analyzer 350 may also be able to detect other types of changes in the second binary executable against the first binary executable. For instance, the analyzer 350 may detect optimizations in the binary of the base version 156 (i.e., the first binary executable) which are no longer valid in view of the selected enhancements. An example of this is as follows. The compiler optimization of the base version 156 alone may have removed a method or class which is needed by one of the selected enhancements. This could be detected by finding part of the base version 156 which was included in the optimized second binary executable, but not found in the optimized first binary executable.

The analyzer 350 might also detect another type of change, by finding parts of the optimized binary of the base version 156 which are no longer needed in view of the selected enhancement(s). This could be accomplished by finding code in the optimized first binary executable, which is not found in the optimized second binary executable. However, as described above, the analyzer 350 might decide not to remove all unused methods or code, in an effort to reduce the size of the binary patch 158.

The analyzer 350 may cause the compiler 340 to output the detected changes as the binary patch 158. As such, when the binary patch 158 is applied by the binary patch utility 154, it may modify the binary of the base version 156 in the device 100 as follows: inserts the new code of the selected enhancement(s); removes parts of the base version 156 code which are no longer needed; and/or restores parts of the base version 156 code which were removed by optimization, but are required by the selected enhancement(s).

In addition, the binary patch 158 might be used to apply transformations (e.g., addition or logical XOR operations) to certain data in the binary code of the base version 156, rather than simply overwriting such data. As an example, the binary patch 158 may implement a transformation like adding the value 2 to the 4-byte value at a designated address in the binary of the base version 156. This would allow encoding the value 2 as a single byte, instead of overwriting all 4 bytes in the given example. Such a feature can increase the efficiency in updating several consecutive addresses in the binary of the base version 156.

Referring again to FIG. 3, the server 130 may also include a developer interface 360 whereby the source code 336 for the base version of the user agent 156 and the available software enhancements are imported into the data storage device 330. Different enhancements may be imported at different times via the developer interface 360. For example, the source code for certain software extensions or enhancements may be developed not only after the base version 156 is compiled into the devices 100, but also after other enhancements are already made available in the server 130 for downloading. Furthermore, it is contemplated that an updated base version of the user agent 156 may be developed and imported into the data storage device 330 to replace the old one (which may or may not also require at least one of the stored enhancements to be replaced).

In an exemplary embodiment, the developer interface 360 may comprise a programming interface, with the necessary input/output devices (not shown) to allow programmers to develop and test the source code 336 on the server 330. On the other hand, the server 130 may also include a source communication module 370 connected to the developer interface 360, which allows the source code 336 to be imported from external computers or servers via network 160. However, it is contemplated that the use of a network 160 to receive the source code 336 is optional; thus the source communication module 370 is illustrated in FIG. 3 using dotted lines. Furthermore, even though the source communication module 370 is illustrated as being connected to network 160, it may be connected to an entirely different network than the one used for receiving enhancement requests from electronic devices 100.

Figure 4:
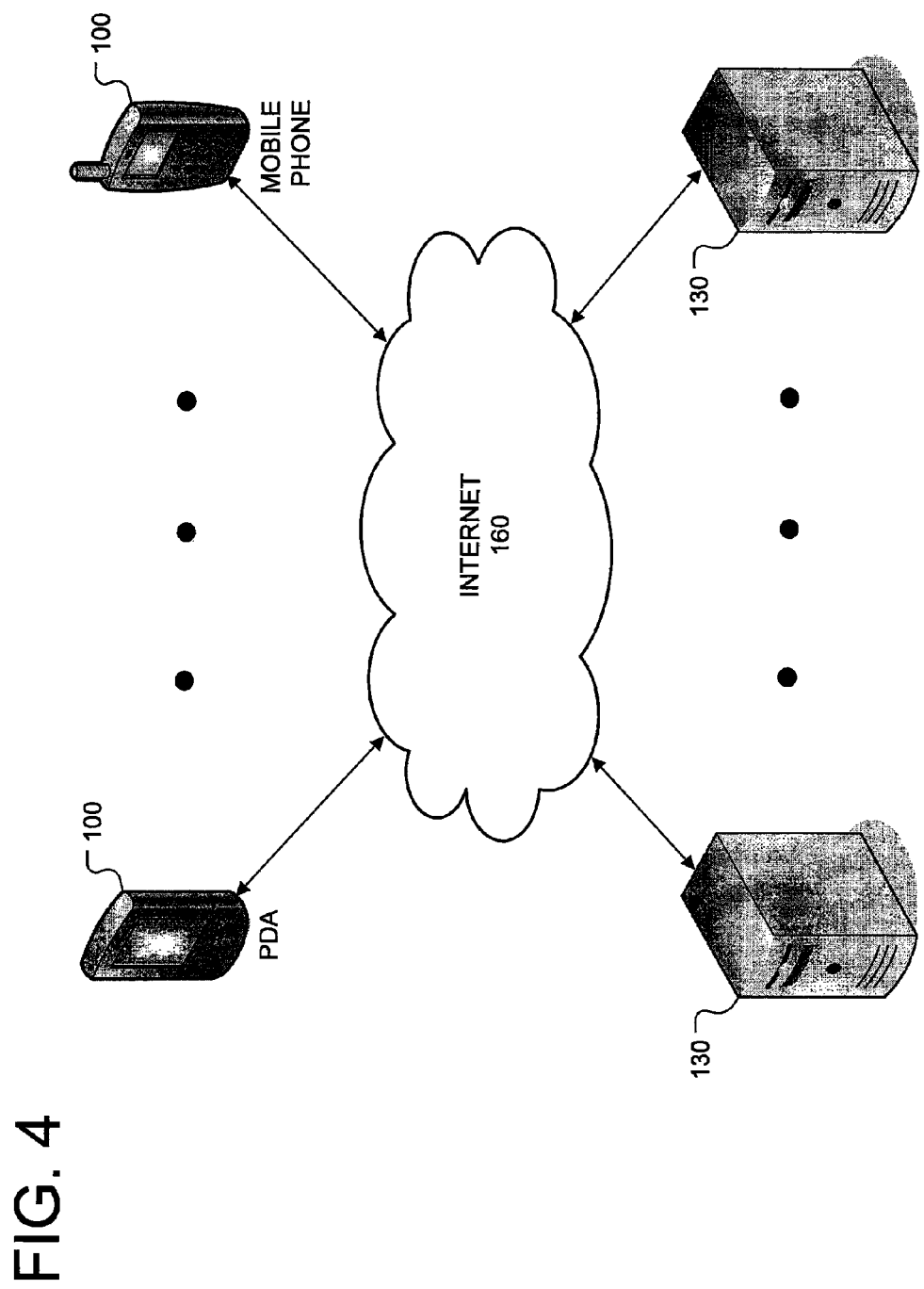
FIG. 4 is a diagram of a system in which enhancements may be downloaded via the Internet, according to an exemplary embodiment of the present invention.

FIG. 4 illustrates a particular implementation of a system for downloading enhancements to one or more types of electronic devices 100 from one or more types of servers 130, according to an exemplary embodiment. Particularly, FIG. 4 illustrates multiple types of electronic devices 100 (e.g., PDA or mobile phone), and each may have a choice of multiple servers 130 from which to download enhancements via a network 160 (e.g., the Internet). For instance, if multiple servers 130 were to offer enhancements of the user agent installed in a particular electronic device 100, this could be accomplished if the source code 336 stored in such servers 130 would allow each of them to generate a binary identical to that of the base version 156 installed in the particular device 100.

An explanation of exemplary processes which may be performed in an electronic device 100 and a server 130, in order to implement aspects of the present invention described herein, will now be described in connection with FIGS. 5-7. Furthermore, FIG. 8 illustrates an exemplary sequence of data communications and processes between the device 100 and server 130 for implementing certain aspects of the present invention.

It should be noted that FIGS. 5-8 is provided solely for the purpose of describing example embodiments. The sequence of operations and processes illustrated therein is not intended to be limiting on the invention. As such, it would be possible to change the sequence of the operations/processes illustrated in these figures, and/or omit one or more of the illustrated operations or processes, without departing from the spirit and scope of the present invention.

Figure 5:
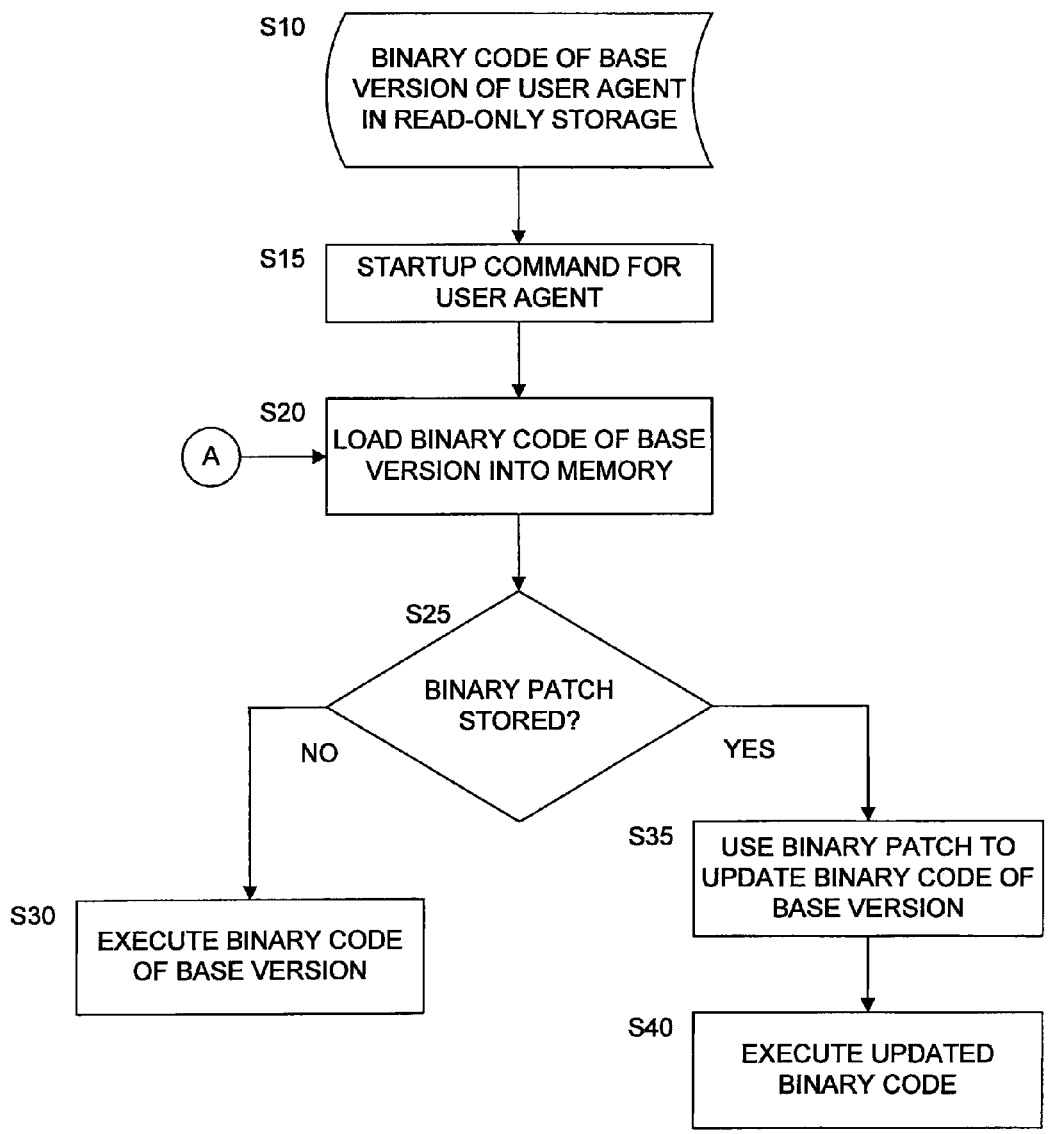
FIG. 5 is a flowchart illustrating a process performed by an electronic device for initiating execution of a user agent, according to an exemplary embodiment of the present invention.
Figure 6:
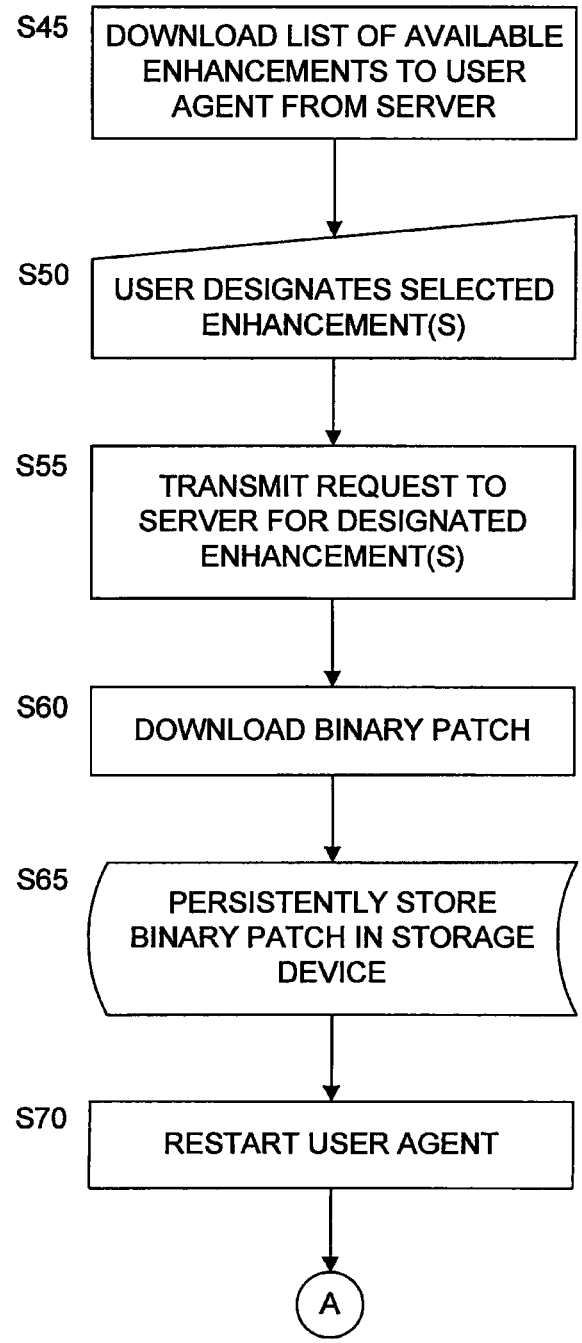
FIG. 6 is a flowchart illustrating a process performed by an electronic device for implementing one or more enhancements in the user agent, according to an exemplary embodiment of the present invention.

FIGS. 5 and 6 are flowcharts illustrating processes to be implemented in an electronic device 100, according to an exemplary embodiment. It is contemplated that the virtual machine 152, when executed, may control the CPU 101 of the device 100 to perform some or all of the operations illustrated in FIGS. 5 and 6. However, it is also possible that other programs may be executed in the device 100 to perform one or more of the operations, possibly in conjunction with the virtual machine 152.

FIG. 5 illustrates a process performed by an electronic device 100 for initiating execution of a user agent, according to an exemplary embodiment. As illustrated in block S10, the code for the binary executable of the base version of the user agent 156 may be initially stored in a particular read-only (or otherwise protected) location of data storage 103. For instance, the device 100 may be shipped to the user with such binary code already installed in data storage 103, or else the user may be allowed to download such code from a server 130 at a later time. Furthermore, although FIG. 5 refers to a read-only area of storage for the binary of the base version 156, this is not strictly required. The area of data storage 103 for the binary of the base station 156 may be protected in the sense that mechanisms may be put in place to help prevent the binary from being removed from that storage area.

Next, block S15 illustrates that a command to start up the user agent is received. For instance, such a command may be issued by the user via an input device, after the device 100 has been turned on and booted up. Alternatively, such command may be issued automatically as a part of the normal routine for powering up the electronic device 100. According to block S20, the binary code of the base version 156 is transferred from its particular area of data storage 103 into memory 102.

According to decision block S25 of FIG. 5, a determination is made as to whether a binary patch 158 is currently stored in another designated area of data storage 103. This step is also illustrated in FIG. 8. Solely for purposes of distinguishing the areas of data storage 103 of the base version 156 and the binary patch 158, respectively, the area of data storage 103 provided for the base version 156 may be referred to as the "first data storage area," while the area of data storage 103 provided for the binary patch may be referred to as the "second data storage area," within the written description and attached claims.

Particularly, whenever an enhancement to the base version of the user agent 156 is downloaded to the device 100, it can be persistently stored in the same second data storage area, replacing a previously-downloaded patch 158 if necessary. This helps simplify the operation of S25 in determining whether a binary patch 158 should be applied to the binary of the base version 156, and eliminate the need to choose between different possible patches 158 to be applied. As mentioned earlier, the binary patch 158 is persistently stored in such area of data storage 103 in the sense that it remains there until it is replaced by a subsequently downloaded binary patch 158 or (optionally) until the user decides to discard the enhancements and revert back to the functionality of the base version 156.

Referring again to FIG. 5, if S25 determines that no binary patch 158 is stored in the designated area of data storage 103, then the binary of the base version 156 is executed as illustrated in block S30. On the other hand, if a binary patch 158 is found, the binary of the base version 156 is updated by applying the binary patch 158 to it, as shown in block S35. The binary patch utility 154 may be called to perform this operation. Then, as illustrated in block S40, the updated binary code resulting from application of the binary patch 158 may be executed. As illustrated in FIG. 8, the result of executing either the binary of the base version 156 (S30), or the updated binary (S40), is that a user agent is now running on the device 100.

FIG. 6 is a flowchart illustrating a process performed by which an electronic device 100 may download from a server 130 one or more enhancements to the user agent, according to an exemplary embodiment. As described earlier, such enhancement(s) may be downloaded in the form of a binary patch 158. Furthermore, as illustrated in FIG. 8, whatever version of the user agent which is currently running on the device 100 may be used for downloading such enhancement(s) in an exemplary embodiment.

According to block S45 of FIG. 6, the electronic device 100 downloads from a server 130 a list of available enhancements to the user agent. For example, as illustrated in FIG. 8, this downloading process may involve the following: the electronic device 100 transmitting a request (e.g., HTTP request) to the server 130 via the network 160 (e.g., Internet), the designated server 130 performing whatever process is necessary to generate a list, and the server 130 transmitting such list to the device 100 as a response to the request. In S45, the device 100 may download a complete list of the enhancements stored in the server 130, or download only a partial list, e.g., as an update to a previously-obtained list.

Since the electronic device 100 now has information on the available enhancements, the user may designate which of these enhancements are to be downloaded. This is illustrated in block S50 of FIG. 6, and also shown in FIG. 8. For example, a list of available enhancements may be presented to the user via display unit 120 (or some other output unit) in a manner allowing for the user to highlight, click on, or otherwise select items from such list. It is contemplated that a user could use a keyboard, mouse or other pointing device, voice command recognizer, or any other type of input device to input his/her selections to the electronic device 100.

It should be understood, however, that it is not absolutely necessary to output the available enhancements to the user as a list. For instance, a configuration wizard (i.e., sequence of dialog boxes) may be run on the electronic device 100 to guide the user through the choice of available enhancements for the user agent.

Also, it is not absolutely necessary for the user to explicitly designate the enhancement(s) to be downloaded in S50. Instead, there may be logic in the device 100 for automatically designating one or more available enhancement(s) to be downloaded from the server 130 according to S50. As an example, the device 100 may be configured to automatically select the newest enhancements as they are made available on the server 130. Else, enhancements may be automatically designated for downloading on the basis of predetermined user preferences which may be, for example, input by the user during setup, or automatically determined by analyzing usage history with respect to the user agent.

In FIG. 6, block S55 shows that the electronic device 100 may transmit a request or message to the server 130 which identifies the enhancement(s) selected by the user. As shown in FIG. 8, this may cause the server 130 to execute a process for compiling the designated enhancement(s) into a binary patch 158 (as will be described below in connection with FIG. 7). After the binary patch 158 is compiled, it may be downloaded to the device 100 as shown in block S65 of FIG. 6 (and also illustrated in FIG. 8). Particularly, the downloaded binary patch 158 will be persistently stored in its designated area of the data storage 103 (i.e., the second data storage area).

As shown in block S70 of FIG. 6, the user agent may be restarted so that the downloaded binary patch 158 can be applied to the binary of the base version 156, thereby allowing the designated enhancements to the user agent to be implemented. This restart may be performed automatically once the download of the binary patch 158 is completed. As shown in FIG. 6, this might cause the electronic device 100 to repeat part of the process of executing the user agent (e.g., starting at S20 of FIG. 5). However, the restart of S70 in FIG. 6 need not be automatic; it may occur when the user decides to shut down, and eventually restart, the user agent or electronic device 100.

Figure 7:
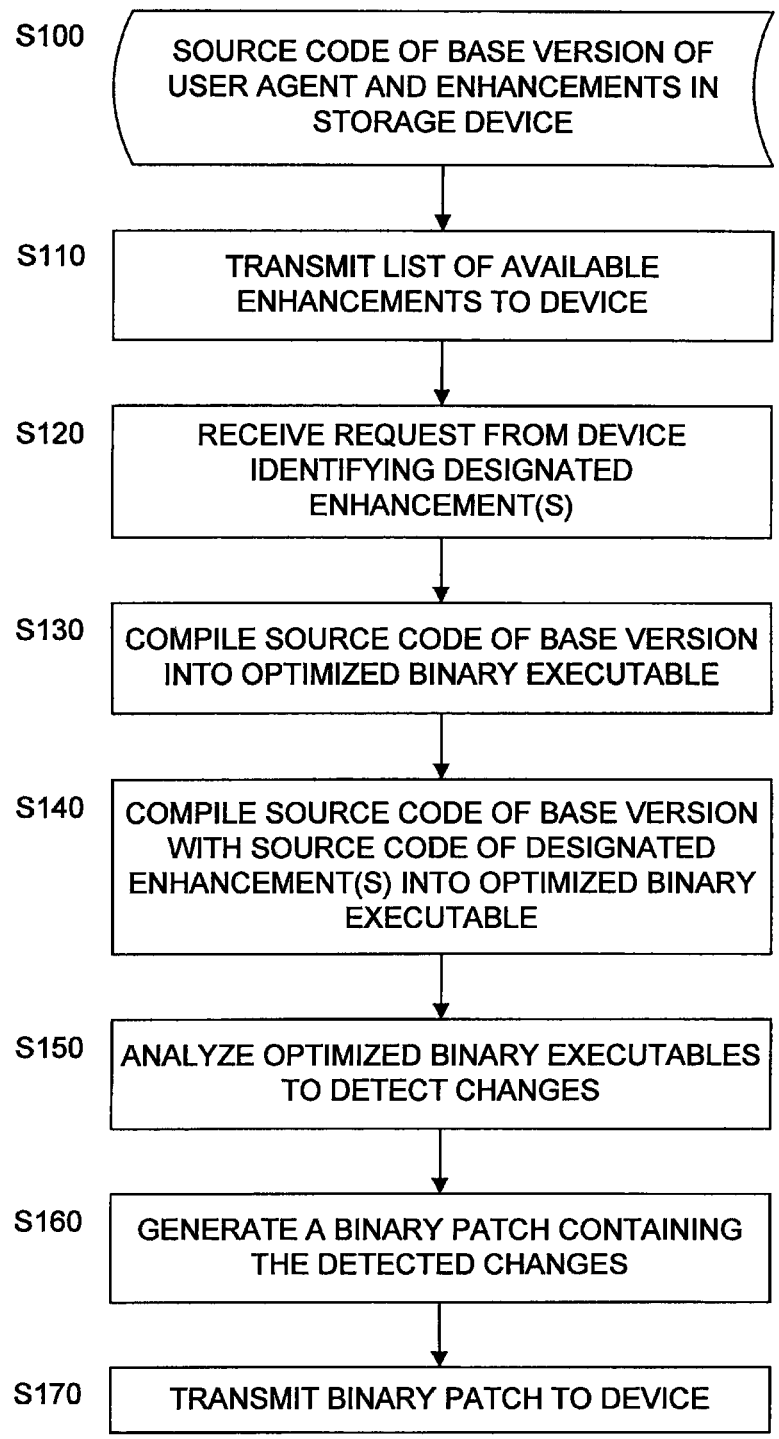
FIG. 7 is a flowchart illustrating a process performed by a server for compiling a binary patch including one or more enhancements to a user agent, according to an exemplary embodiment of the present invention.
Figure 8:
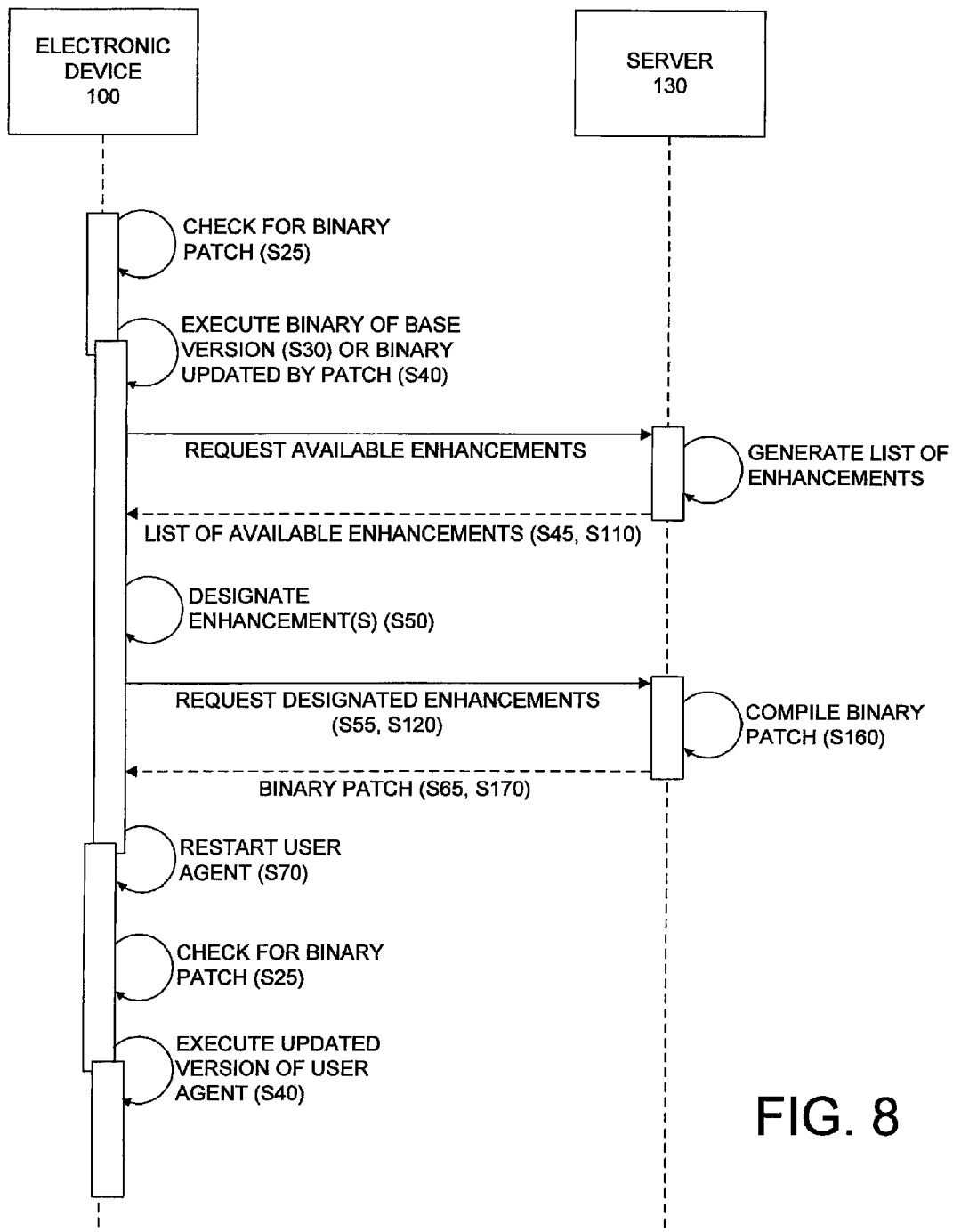
FIG. 8 is a sequence diagram illustrating a sequence of communications and processes performed by an electronic device and a server, according to an exemplary embodiment of the present invention.

FIG. 7 is a flowchart illustrating a process performed by a server 130 for compiling a binary patch 158 including one or more enhancements of a user agent, according to an exemplary embodiment. This process could be executed by one or more computer processors in the server 130 (not shown in the drawings), according to computer-executable instructions embodied in a storage medium of the server 130, e.g., somewhere in the data storage device 330.

As illustrated in block S100 of FIG. 7, the source code 336 of the base version of the user agent 156 and available enhancements thereof are stored in the data storage device 330 of the server 130. The source code 336 may be updated from time to time, e.g., by adding source code of new enhancements and possibly removing the source code of outdated enhancements.

According to block S110, the server 130 transmits the list of available enhancements to an electronic device 100. As illustrated in FIG. 8, this list may be generated and transmitted in response to a request from the device 100. Alternatively, the server 130 may be programmed to automatically transmit to the electronic device 100 a listing of the most recently-added enhancements from time to time (e.g., such transmissions may be broadcast to multiple devices 100).

Referring again to FIG. 7, block S120 shows that the server 130 may receive a request or from an electronic device 100 designating one or more of the available enhancements of the user agent to be downloaded. As illustrated in FIG. 8, the receipt of such request may initiate a process, whereby the server 130 ultimately compiles a binary patch 158 and transmits it to the device 100. An example of such a process is illustrated by blocks S130, S140, S150, S160, and S170 of FIG. 7.

According to S130, the server 130 may utilize its compiler 340 to compile only the source code of the base version of the user agent 156 into an optimized binary executable (referred to hereinabove as "the first binary executable"). As shown in S140, the compiler 340 may perform a separate operation of compiling the source code of the base version 156 together with the source code of the designated enhancement(s) into another optimized binary executable (referred to hereinabove as "the second binary executable"). The order in which S130 and S140 are performed is not important, and may be switched from that in FIG. 7.

According to S150 of FIG. 7, the server 130 may analyze the first and second binary executables in order to detect changes in the second binary executable against the first binary executable, i.e., to detect changes implemented by the designated enhancement(s) against the base version 156. Such analysis is described above in connection with the analyzer component 350 of FIG. 3. According to such analysis, the second binary executables may be compared against the first binary executable in order to detect the changes such as:

Type 1: The second binary executable contains code compiled from the source code of the designated enhancement(s), which is not found in the first binary executable. Such binary code should be added, by application of the binary patch 158, to the binary of the base version 156 installed in the electronic device 100.

Type 2: The second binary executable contains code compiled from the source code of the base version 156, which cannot be found in the first binary executable. This would indicate that the compiler optimization of the first binary executable caused some code to be removed from the base version 156 which is needed by the designated enhancement(s). Such binary code should be added, by application of the binary patch 158, to the binary of the base version 156 in the device 100.

Type 3: The first binary executable contains code compiled from the source code of the base version 156, which cannot be found in the second binary executable. This would indicate that some of the source code of the base version 156 is rendered obsolete by the source code in the designated enhancement(s). In order to optimize the binary of the base version 156 in the device 100, such obsolete code should be deleted by applying the binary patch 158.

It should be noted that the three types of changes listed above is not intended to be an exhaustive list of the types of changes that might be applied to the binary of the base version 156 as a result of implementing the designated enhancement(s)

According to S160 of FIG. 7, the binary patch 158 is generated, containing the detected changes in the second binary executable against the first binary executable. As described above in connection with FIG. 3, the analyzer component 350 in the server 130 may be designed to output the changes in the second binary executable against the first as the binary patch 158. For example, the analyzer 350 may be installed as a diff utility, or functionally equivalent software, capable of performing S150 and S160.

As such, the binary patch 158 may be compiled so that it capable of implementing any of the following types of modifications to the binary of the base version 156 when applied by the binary patch utility 154: inserting new code of the selected enhancement(s) (i.e., Type 1 changes); re-inserting that was removed from the base version 156 by previous optimization, but is now needed by the designated enhancement(s) (i.e., Type 2 changes); and/or removing code that is rendered obsolete by the code of the selected enhancement(s) (i.e., Type 3 changes).

In S170 of FIG. 7, the binary patch 158 is transmitted by the server 130 to the electronic device 100, where the binary patch 158 can be applied to the binary of the base version 156 according to the binary patch utility 154.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for executing a user agent in an electronic device connected to a network, the method comprising:
   storing binary code of a base version of the user agent in a first data storage area of the device;
   utilizing a processor in the device to execute the user agent;
   while the user agent is running,
      receiving via an input device, user designation of one or more selectable enhancements to the user agent;
      transmitting to a server via the network, a message identifying the one or more designated enhancements; and
      downloading a binary patch from the server in response to the transmitted message; and
   in response to downloading the binary patch, utilizing the processor in the device to restart the user agent by:
      loading the binary code of the base version in the first data storage into memory;
      determining that the downloaded binary patch is stored in a second data storage area of the device; and
      applying the binary patch to update the binary code of the base version and executing the updated binary code,
   wherein the transmitted message initiates a process whereby the one or more designated enhancements are compiled into the binary patch, and
   wherein the processor executes a virtual machine, the virtual machine being used to perform the steps for initiating execution of the user agent.

2. The method of claim 1, wherein the binary patch is persistently stored in the second data storage, and used for updating the binary code of the base version during subsequent restarts of the user agent, until being replaced by another binary patch.

3. The method of claim 1, wherein the user agent is compiled into a byte-code binary executable.

4. The method of claim 1, wherein the first data storage area is read-only.

5. An electronic device connected to a network, comprising:
   a data storage device including first and second data storage areas, the first data storage area storing binary code of a base version of a user agent;
   a processor programmed to execute the user agent, and while the user agent is running,
      receive via an input device, user designation of one or more selectable enhancements to the user agent;
      transmit to a server via the network, a message identifying the one or more designated enhancements; and
      download a binary patch from the server in response to the transmitted message; and
      in response to downloading the binary patch, utilize the processor in the device to restart the user agent by:
         loading the binary code of the base version in the first data storage into memory;
         determining that the downloaded binary patch is stored in a second data storage area of the device; and
         applying the binary patch to update the binary code of the base version and executing the updated binary code,
   wherein the transmitted message initiates a process whereby the one or more designated enhancements are compiled into the binary patch, and
   wherein the processor executes a virtual machine, the virtual machine being used to perform the steps for initiating execution of the user agent.

6. The device of claim 5, wherein the binary patch is persistently stored in the second data storage, and used for updating the binary code of the base version during subsequent restarts of the user agent, until being replaced by another binary patch.

7. The device of claim 5, wherein the user agent is compiled into a byte-code binary executable.

8. The device of claim 5, wherein the first data storage area is read-only.

9. A computer-readable storage device on which is stored instructions which, when executed, cause a computer to perform the method of claim 1.

* * * * *